(12) United States Patent  
Tozawa (10) Patent No.: US 8,629,924 B2  
(45) Date of Patent: Jan. 14, 2014

(54) IMAGE PROCESSING APPARATUS AND IMAGE PROCESSING METHOD

(75) Inventor: Shohei Tozawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/565,262

(22) Filed: Aug. 2, 2012

(65) Prior Publication Data

US 2013/0038763 A1 Feb. 14, 2013

(30) Foreign Application Priority Data

Aug. 9, 2011 (JP) ................................ 2011-174256

(51) Int. Cl.  
*H04N 9/64* (2006.01)

(52) U.S. Cl.  
USPC .......................................... 348/247; 348/246

(58) Field of Classification Search  
USPC .................................................. 348/246, 247  
See application file for complete search history.

(56) References Cited

U.S. PATENT DOCUMENTS 7,301,572 B2 * 11/2007 Kitani ............................ 348/247  
8,154,630 B2 * 4/2012 Tsuruoka ...................... 348/241  
2003/0169352 A1 * 9/2003 Kitani ............................ 348/247  
2007/0040919 A1 * 2/2007 Tsuruoka ...................... 348/241  
2007/0263111 A1 * 11/2007 Satodate ........................ 348/311  
2010/0026859 A1 * 2/2010 Tsuruoka ...................... 348/241  
2011/0032393 A1 * 2/2011 Yamaguchi .................... 348/247

FOREIGN PATENT DOCUMENTS

JP 2005-175987 6/2005

* cited by examiner

*Primary Examiner* — Lin Ye  
*Assistant Examiner* — Amy Hsu  
(74) *Attorney, Agent, or Firm* — Cowan, Liebowitz & Latman, P.C.

(57) ABSTRACT

An image processing apparatus that processes image data output from an image sensing device including a plurality of pixels, comprises: a storage unit that stores defect data at least including first information showing grades of defective pixels that are subject to correction and, with respect to each defective pixel among the plurality of pixels, address information, second information showing a grade of the defective pixel; an acquisition unit that acquires an imaging condition and an imaging environment at a time of image sensing; a determination unit that compares the first information and the second information, and determines whether defect correction of each defective pixel is necessary or not based on a comparison result; and a correction unit that performs the defect correction on image data output from a defective pixel for which the determination unit determines that defect correction is necessary.

6 Claims, 10 Drawing Sheets

| ADDRESS | DEFECT ID | DEFECT GRADE |
|---|---|---|
| (125,34) | ID1 | 3 |
| (84,180) | ID3 | 7 |
| (394,92) | ID2 | 1 |
| ⋮ | ⋮ | ⋮ |

FIG. 9A

ID1: WHITE DEFECT

0~65°C

| SET ISO | CHARGE ACCUMULATION TIME | | | |
|---|---|---|---|---|
| | 1/8000 TO 1/8 SECOND | 1/6 TO 4 SECONDS | 5 TO 13 SECONDS | 15 SECONDS OR MORE |
| LESS THAN 200 | 1 | 1 | 5 | 9 |
| 200 OR MORE AND LESS THAN 400 | 1 | 3 | 5 | 9 |
| 400 OR MORE AND LESS THAN 1600 | 3 | 5 | 7 | 9 |
| 1600 OR MORE AND LESS THAN 3200 | 5 | 7 | 9 | 9 |
| 3200 OR MORE | 9 | 9 | 9 | 9 |

65°C OR MORE

| SET ISO | CHARGE ACCUMULATION TIME | | | |
|---|---|---|---|---|
| | 1/8000 TO 1/8 SECOND | 1/6 TO 4 SECONDS | 5 TO 13 SECONDS | 15 SECONDS OR MORE |
| LESS THAN 200 | 1 | 1 | 5 | 9 |
| 200 OR MORE AND LESS THAN 400 | 1 | 3 | 7 | 9 |
| 400 OR MORE AND LESS THAN 1600 | 3 | 7 | 9 | 9 |
| 1600 OR MORE AND LESS THAN 3200 | 7 | 9 | 9 | 9 |
| 3200 OR MORE | 9 | 9 | 9 | 9 |

FIG. 9B

ID2: DEFECT THAT CHANGES DEPENDING ON ISO

| SET ISO | |
|---|---|
| LESS THAN 200 | 1 |
| 200 OR MORE AND LESS THAN 400 | 3 |
| 400 OR MORE AND LESS THAN 1600 | 5 |
| 1600 OR MORE AND LESS THAN 3200 | 7 |
| 3200 OR MORE | 9 |

FIG. 9C

ID3: DEFECT THAT CHANGES DEPENDING ON F NUMBER

| Fno | |
|---|---|
| F1.0 OR MORE | 3 |
| F2.8 OR MORE | 5 |
| F5.6 OR MORE | 7 |
| F16.0 OR MORE | 9 |

IMAGE PROCESSING APPARATUS AND IMAGE PROCESSING METHOD

BACKGROUND OF THE INVENTION

1. Field of the Invention

The present invention relates to an image processing apparatus and an image processing method, and more particularly to an image processing apparatus and an image processing method having a function that corrects a signal that is output from a defective pixel.

2. Description of the Related Art

Image processing apparatuses such as an electronic camera which uses a memory card having a solid-state memory element as a recording medium, and records and plays back still images and moving images sensed by a solid-state image sensing device such as a CCD or a CMOS are already on the market. It is known that when sensing an image using a solid-state image sensing device such as a CCD or a CMOS, image quality degradation occurs due to dark current noise generated by the image sensing device, a defective pixel that is unique to the image sensing device, or the like.

A conventional method of correcting such defective pixels involves assessing the output for a standard charge accumulation time under a predetermined condition at the time of factory shipment of the sensor, and determining whether pixels are defective based on the assessment results. Further, data regarding the kind of defect (a black defect, a white defect, or the like), the address, and the defect level of the relevant pixel is obtained, and the defective pixel is corrected using the data.

However, it is known that the degree of a defective pixel varies significantly depending on the conditions when sensing an image. Accordingly, for example, even in the case of a pixel that does not constitute a problem when performing general image sensing at a normal high shutter speed, the level thereof as a defective pixel increases when image sensing is performed at a slow shutter speed, and the pixel adversely affects the image quality. To avoid this problem, Japanese Patent Laid-Open No. 2005-175987 discloses technology that corrects defective pixels by taking into consideration the temperature of the image sensing device, the shutter speed and the sensitivity as conditions at the time of image sensing.

In this case, if a defect is a so-called "white defect", as described in Japanese Patent Laid-Open No. 2005-175987, it is possible to define assessment conditions by taking into consideration the temperature, the shutter speed and the sensitivity. However, the kind of defective pixel is also an important factor. For example, some defective pixels are only affected by the sensitivity and are not affected at all by the exposure time (such defective pixels are referred to as a so-called "blinking defect"). In such a case, it is necessary to perform correction processing for the defective pixel at a time of a high sensitivity. However, appropriate conditions cannot be established based on assessment conditions that take into consideration the temperature and exposure time in addition to the sensitivity that are set for a white defect, and consequently, depending on the imaging conditions, there is the possibility that such defective pixels will be overcorrected or will not be corrected at all. Therefore, in some cases the image quality of a sensed image is degraded.

SUMMARY OF THE INVENTION

The present invention has been made in consideration of the above situation, and the present invention enables to perform appropriate correction in accordance with the kind of defect of a defective pixel of an image sensing apparatus.

According to the present invention, provided is an image processing apparatus that processes image data that is output from an image sensing device including a plurality of pixels, comprising: a storage unit that stores defect data that comprises: a plurality of tables in which imaging conditions or an imaging environment and first information showing grades of defective pixels that are subject to correction are associated with each other; and, with respect to each defective pixel among the plurality of pixels, address information, reference table information showing a table to be referred to among the plurality of tables, and second information showing a grade of the defective pixel; an acquisition unit that acquires an imaging condition and an imaging environment at a time of image sensing; a determination unit that compares the first information that is shown by a table corresponding to the reference table information and the second information of each defective pixel in the defect data with respect to the imaging condition or imaging environment that the acquisition unit acquires, and determines whether defect correction of each defective pixel is necessary or not based on a comparison result; and a correction unit that performs the defect correction on image data that is output from a defective pixel for which the determination unit determines that defect correction is necessary; wherein: the imaging conditions include a charge accumulation time, a sensitivity, and an f number at a time of image sensing, and the imaging environment includes a temperature of the image sensing device at a time of image sensing; and the plurality of tables include: a first table showing a temperature of the image sensing device at a time of image sensing, a sensitivity at a time of image sensing, a charge accumulation time at a time of image sensing, and a grade of a defective pixel that is subject to correction; a second table showing a sensitivity at a time of image sensing and a grade of a defective pixel that is subject to correction; and a third table showing an f number at a time of image sensing and a grade of a defective pixel that is subject to correction.

According to the present invention, provided is an image processing method for an image processing apparatus that processes image data that is output from an image sensing device including a plurality of pixels, and that has a first storage unit that stores a plurality of tables in which imaging conditions or an imaging environment and first information showing grades of defective pixels that are subject to correction are associated with each other, and a second storage unit that stores defect data including, with respect to each defective pixel among the plurality of pixels, address information, reference table information showing a table to be referred to among the plurality of tables, and second information showing a grade of the defective pixel, comprising: an acquisition step of acquiring an imaging condition and an imaging environment at a time of image sensing; a determination step of comparing the first information that is shown by a table corresponding to the reference table information and the second information of each defective pixel in the defect data with respect to the imaging condition or imaging environment that is acquired in the acquisition step, and determining whether defect correction of each defective pixel is necessary or not based on a comparison result; and a correction step of performing the defect correction on image data that is output from a defective pixel for which it is determined that defect correction is necessary in the determination step; wherein: the imaging conditions include a charge accumulation time, a sensitivity, and an f number at a time of image sensing, and the imaging environment includes a temperature of the image sensing device at a time of image sensing; and the plurality of tables include: a first table showing a temperature of the image sensing device at a time of image sensing, a sensitivity at a time of image sensing, a charge accumulation time at a time of image sensing, and a grade of a defective pixel that is subject to correction; a second table showing a sensitivity at a time of image sensing and a grade of a defective pixel that is subject to correction; and a third table showing an f number at a time of image sensing and a grade of a defective pixel that is subject to correction.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Figure 1:
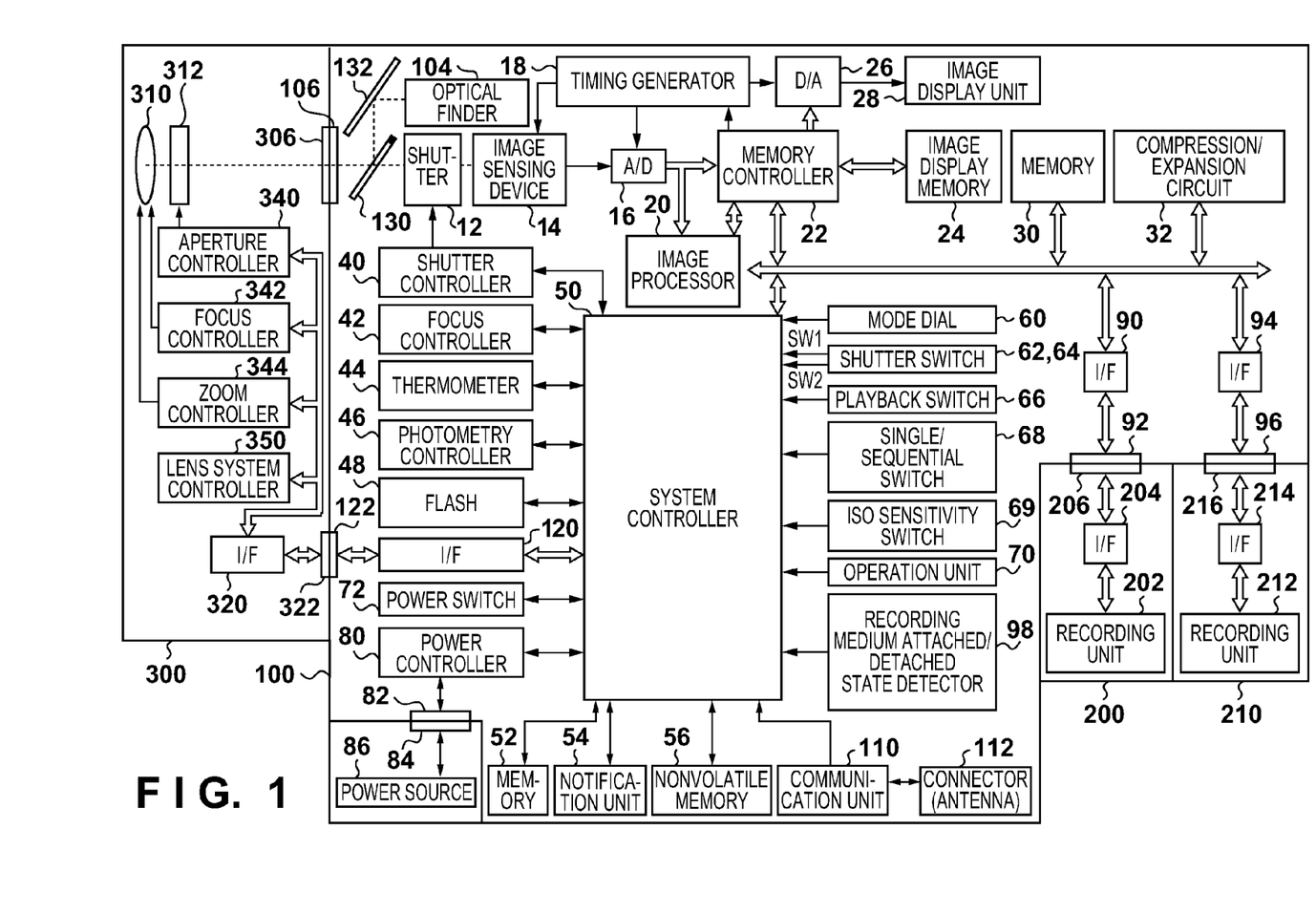
FIG. 1 is a block diagram showing a configuration of an image sensing apparatus according to an embodiment of the present invention.

As shown in FIG. 1, the image sensing apparatus of the present embodiment is configured primarily by an image processing apparatus 100 and an interchangeable lens unit 300.

The lens unit 300 includes an image sensing lens 310 composed of a plurality of lenses, an aperture 312, and a lens mount 306 that mechanically joins the lens unit 300 to the image processing apparatus 100. The lens mount 306 includes various functions for electrically connecting the lens unit 300 to the image processing apparatus 100. That is, the lens mount 306 is provided with an interface 320 for connecting the lens unit 300 to the image processing apparatus 100, and a connector 322 that electrically connects the lens unit 300 to the image processing apparatus 100.

The connector 322 is also provided with the function of being supplied with or supplying currents of various voltages, as well as exchanging control signals, status signals and data signals between the image processing apparatus 100 and the lens unit 300. Also, the connector 322 may be configured to perform not only telecommunications but optical communications, audio communication and the like.

An aperture controller 340 controls the aperture 312 in coordination with a shutter controller (described later) for controlling a shutter 12 of the image processing apparatus 100, based on photometric information from a photometry controller 46. A focus controller 342 controls the focusing of the image sensing lens 310, and a zoom controller 344 controls the zooming of the image sensing lens 310.

A lens system controller 350 controls the overall lens unit 300. The lens system controller 350 is provided with a memory for storing constants, variables, programs and the like for use in operations. Further, the lens system controller 350 is also provided with a nonvolatile memory for storing, for example, identification information such as a number unique to the lens unit 300, management information, function information such as maximum and minimum aperture values and the focal length, and current and past setting values.

The configuration of the image processing apparatus 100 is described next.

A lens mount 106 mechanically joins the image processing apparatus 100 and the lens unit 300. Mirrors 130 and 132 direct light beams incident on the image sensing lens 310 to an optical finder 104. Note that the mirror 130 may be either a quick-return mirror or a half mirror. An image sensing device 14 converts optical images to electrical signals. A shutter 12 controls the exposure amount to the image sensing device 14. Light beams incident on the image sensing lens 310 are directed via the aperture 312, the lens mounts 306 and 106, the mirror 130 and the shutter 12 using an SLR system, and formed on the image sensing device 14 as an optical image.

An A/D converter 16 converts an analog signal output from the image sensing device 14 into a digital signal. A timing generator 18 supplies a clock signal and a control signal respectively to the image sensing device 14, the A/D converter 16 and a D/A converter 26. The timing generator 18 is controlled by a memory controller 22 and a system controller 50.

An image processor 20 performs predetermined pixel interpolation processing and color conversion processing on image data from the A/D converter 16 or image data from the memory controller 22. As necessary, the image processor 20 performs predetermined calculation processing using image data outputted from the A/D converter 16. The system controller 50 performs through-the-lens (TTL) auto focus (AF) processing, auto exposure (AE) processing and pre-flash (EF) processing for controlling the shutter controller 40 and a focus controller 42, based on the obtained calculation results. Further, the image processor 20 performs predetermined calculation processing using the image data outputted from the A/D converter 16, and performs TTL auto white balance (AWB) processing based on the obtained calculation results.

Note that in the example shown in FIG. 1 according to the present embodiment, the image processing apparatus 100 comprises the focus controller 42 and photometry controller 46 as dedicated components. Accordingly, the image processing apparatus 100 may be configured to perform AF processing, AE processing, and EF processing using the focus controller 42 and the photometry controller 46, and not to perform AF processing, AE processing, and EF processing using the image processor 20. Alternatively, AF processing, AE processing, and EF processing may be performed using the focus controller 42 and the photometry controller 46, and also performed using the image processor 20.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

An image display unit 28 comprises a TFT LCD (Liquid Crystal Display) or the like. Image data for display written into the image display memory 24 is displayed on the image display unit 28 via the D/A converter 26. An electronic view finder (EVF) function can be realized by sequentially displaying sensed image data using the image display unit 28. Further, the image display unit 28 arbitrarily turns on/off its display in accordance with an instruction from the system controller 50. If the display is turned off, the electric consumption of the image processing apparatus 100 can be greatly reduced.

The memory 30, used for storing obtained still images and moving images, has a sufficient storage capacity for storing a predetermined number of still images and a moving image for a predetermined period. In sequential image sensing or panoramic image sensing to sequentially obtain a plural number of still images, a large amount of image data can be written into the memory 30 at a high speed. Further, the memory 30 may be used as a work area for the system controller 50.

The compression/expansion circuit 32 compresses or expands image data using a known compression method, such as adaptive discrete cosine transformation (ADCT). The compression/expansion circuit 32 reads image data stored in the memory 30 and performs compression or expansion processing on the read image data, and writes the processed data into the memory 30.

The shutter controller 40 controls the shutter 12 in cooperation with the aperture controller 340, which controls the aperture 312, on the basis of photometric information from the photometry controller 46. The focus controller 42 is for performing AF (auto focus) processing. The focus controller 42 measures the focused state of an optical image formed of light flux which entered the image sensing lens 310 of the lens unit 300 and was caused to enter the focus controller 42 via the aperture 312, the lens mounts 306 and 106, the mirror 130, and a sub-mirror for focusing (not shown).

A thermometer 44 detects the temperature of the imaging environment. When a thermometer is incorporated into a sensor, the dark current of the sensor can be estimated more accurately.

The photometry controller 46 is for performing AE (auto exposure) processing. The photometry controller 46 measures the exposure state of an optical image formed of light flux which entered the image sensing lens 310 of the lens unit 300 and was caused to enter the photometry controller 46 via the aperture 312, the lens mounts 306 and 106, the mirror 130, and a sub-mirror for photometry (not shown). A flash 48 has an AF auxiliary light projection function and a flash adjusting function. The photometry controller 46 is interlocked with the flash 48 to realize the EF (flash light control) processing function.

Note that, as described above, exposure control and AF control may be performed in accordance with the result of calculations by the image processor 20 based on the image data from the A/D converter 16. In that case, the system controller 50 can control the shutter controller 40, the aperture controller 340, and the focus controller 342 to perform exposure control and AF control using a video TTL method.

Further, the AF control may be performed in accordance with a result of measurement by the focus controller 42 and the result of calculations by the image processor 20 based on the image data from the A/D converter 16. Furthermore, the exposure control may be performed in accordance with a result of photometry by the photometry controller 46 and in accordance with the result of calculations by the image processor 20 based on the image data from the A/D converter 16.

The system controller 50 controls the overall image processing apparatus 100 and incorporates a known CPU, for instance. A memory 52 stores, inter alia, the constants, variables, and programs for operation of the system controller 50. The memory 52 also stores information (defect data) relating to defective pixels that were detected in the manufacturing process of the image sensing device 14. In the present embodiment, as defective pixel information, the memory 52 stores address information of each defective pixel, information showing the kind of defect (hereunder, referred to as "defect ID"), and information showing a grade (hereunder, referred to as "defect grade") of each defective pixel that is determined by classifying levels showing the conspicuity of defects into a number of gradations in accordance with output signal levels. The defective pixel information may include a common single item of defect data for a plurality of pixels that have the same defect ID and defect grade, and may also include a plurality of items of defect data for a single pixel.

A notification unit 54 notifies operating statuses, messages and the like to the outside by using characters, images, sound and the like, in correspondence with execution of a program by the system controller 50. The notification unit 54 comprises one or more combinations of display devices including, for example, an LCD and an LED for visual notification and sound generating devices for audio notification. Especially, the display device or devices is/are provided at one or a plurality of visually-recognizable positions around an operation unit 70 of the image processing apparatus 100. Further, a part of the functions of the notification unit 54 is provided within the optical finder 104.

The display contents of the notification unit 54, displayed on the LCD or the like, include indication relating to an image sensing mode, such as single-shot/sequential image sensing, and a self-timer. The display contents also include indication relating to recording, such as a compression rate, the number of recording pixels, the number of recorded images, and the number of recordable images. Further, the display contents include indication relating to imaging conditions, such as a shutter speed, an f number (aperture value), exposure correction, flash illumination, and red-eye reduction. In addition to the above, the display contents also include indication of an ISO sensitivity, macro image sensing, a buzzer-set state, a timer battery level, a battery level, an error state, information of plural digit numbers, an attached/detached status of recording media 200 and 210, an attached/detached status of the lens unit 300, operation of a communication I/F, a date and time, and a connection state with an external computer.

Further, the display contents of the notification unit 54, displayed within the optical finder 104, include, for example, indication of a focus state, an image sensing ready state, a camera shake warning, a flash charge state, a flash ready state, the shutter speed, the f number (aperture value), the exposure correction, and a writing state to a recording medium.

Furthermore, the display contents of the notification unit 54, displayed on the LCD or the like, include, for example, indication of a focus state, an image sensing ready state, a camera shake warning, a flash charge state, a flash ready state, a writing state to a recording medium, a macro image sensing setting, and a secondary battery charge state.

Further, the display contents of the notification unit 54, displayed by a lamp or the like, include, for example, indication of a self-timer notification or the like. The lamp used for the indication of the self-timer notification may also be used as an AF auxiliary light.

A nonvolatile memory 56 includes, for example, an electrically erasable and recordable EEPROM, on which programs (to be described later) and the like are stored. The nonvolatile memory 56 stores data relating to setting values such as a variety of parameters and ISO sensitivity, as well as to setting modes and the like.

Operation means 60, 62, 64, 66, 68, 69 and 70 are for the user to input various operation instructions to the system controller 50, that comprise a single or a plurality of combinations of switches, dials, touch panels, a device for pointing by line-of-sight detection, a voice recognition device, or the like. These operation means will now be described in more detail.

A mode dial switch 60 is for selecting various image sensing modes such as an automatic image sensing mode, a programmed image sensing mode, a shutter-speed-priority image sensing mode, an aperture-priority image sensing mode, a manual image sensing mode, a focal depth priority (depth) image sending mode, a portrait image sensing mode, a landscape image sensing mode, a close-up image sensing mode, a sport image sensing mode, a night view image sensing mode, and a panoramic image sensing mode.

A shutter switch SW1 is turned on by partially depressing (for example, a half stroke of) a shutter button (not shown), to instruct the start of the operations of the AF processing, the AE processing, the AWB processing, the EF processing and the like.

A shutter switch SW2 is turned on by completely depressing (i.e. a full stroke of) the shutter button (not shown), to instruct the start of a series of operations including exposure processing, development processing and recording processing. First, in the exposure processing, a signal read from the image sensing device 14 is written into the memory 30 via the A/D converter 16 and the memory controller 22. Next, development processing is performed using calculations by the image processor 20 and the memory controller 22. In the recording processing, the image data is read from the memory 30 and compressed by the compression/expansion circuit 32, and the compressed image data is written into the recording medium 200 or 210.

A playback switch 66 is operated to instruct the start of a playback operation of reading image data sensed in the image sensing mode from the memory 30 or the recording medium 200 or 210, and displaying the read image data on the image display unit 28.

A single/sequential switch 68 can be used to set a single shot mode in which, when the shutter switch SW2 is pressed, an image of one frame is sensed and the device then enters a stand-by state, and a sequential shot mode in which images are sequentially sensed while the shutter switch SW2 is pressed.

An ISO sensitivity switch 69 can set the ISO sensitivity by changing a gain setting in the image sensing device 14 or the image processor 20.

An operation unit 70 comprises various buttons and touch panels including, for example, a menu button, a set button, a macro button, a multi-image playback/repaging button, a flash set button, a single-shot/sequential/self-timer image sensing selection button, a forward (+) menu item selection button, a backward (−) menu item selection button, a forward (+) playback image search button, a backward (−) playback image search button, an image sensing quality selection button, an exposure correction button, and a date/time set button. The operation unit 70 also comprises a selection/changeover button for selecting and changing over various functions upon executing image sensing and playback in, for example, the panoramic mode, and a set/execution button for setting and executing the various functions upon executing image sensing and playback in, for example, the panoramic mode. The operation unit 70 further comprises: an image display ON/OFF switch for setting the on/off state of the image display unit 28; a quick review ON/OFF switch for setting a quick review function for automatically playing back sensed image data immediately after image sensing; a compression mode switch for selecting the compression ratio of, for example, JPEG compression or to select a CCDRAW mode in which a signal from the image sensing device is directly digitized and recorded on a recording medium. Furthermore, the operation unit 70 comprises a playback switch capable of setting respective function modes such as a playback mode, a multi-image playback/deletion mode, and a PC connection mode. The forward (+) and backward (−) selection buttons may be configured as a rotary dial switch, which can facilitate selection of numerical values and functions.

A power switch 72 is to operated to switch and set the power ON/OFF mode of the image processing apparatus 100. The power switch 72 can also be operated to switch and set the power ON/OFF settings of various accessory devices including the lens unit 300, an external flash, and the recording media 200 and 210 which are connected to the image processing apparatus 100.

A power controller 80 comprises a battery detection circuit, a DC-DC converter, a switch circuit to switch the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for a necessary period.

A power source 86 comprises a primary battery such as an alkaline battery or a lithium battery, a secondary battery such as an NiCd battery, an NiMH battery, an Li-ion battery, or an Li polymer battery, an AC adapter, or the like. The power source 86 is detachably connected to the power controller 80 through connectors 82 and 84.

Interfaces 90 and 94 are for connecting to recording media such as a memory card or a hard disk through the connectors 92 and 96. A recording medium attached/detached state detector 98 detects whether the recording medium 200 and/or 210 is attached to the connector 92 and/or 96.

In the present embodiment, two systems of interfaces and connectors for connection with the recording media are employed. However, the number of systems is not limited, and a single or plurality of systems of interfaces and connectors for connection with recording media may be provided. Further, interfaces and connectors pursuant to different standards may be combined.

Interfaces and connectors that conform to various recording medium standards can be used as the above described interfaces and connectors in the image processing apparatus 100. Examples thereof include Personal Computer Memory Card International Association (PCMCIA) cards, compact flash (CF) (registered trademark) cards, and SD cards. In a case where interfaces and connectors in conformity with the PCMCIA standards, CF (registered trademark) card standards and the like are used as the interfaces 90 and 94 and the connectors 92 and 96, image data and management information attached to the image data can be transferred between the image processing apparatus 100 and other peripheral devices such as a computer and a printer by connection with various communication cards such as a LAN card, a modem card, a Universal Serial Bus (USB) card, an IEEE (Institute of Electrical and Electronic Engineers) 1394 card, a P1284 card, an SCSI (Small Computer System Interface) card and a PHS card.

The optical finder 104 allows a user to observe an optical image of a subject formed by the image sensing lens 310, via the aperture 312, the lens mounts 306 and 106, and the mirrors 130 and 132. Thereby, the optical finder 104 can be used for image sensing without the electronic view finder function provided by the image display unit 28. Further, some of the functions of the notification unit 54 such as, for example, indication of the focus state, the camera shake warning, the flash charge state, the shutter speed, the f number (aperture value), and the exposure compensation are displayed in the optical finder 104.

A communication unit 110 has various communication functions, such as for RS232C, USB, IEEE 1394, P1284, SCSI, modem, LAN, and wireless communication. A connector 112 connects the image processing apparatus 100 to another device via the communication unit 110. In the case of wireless communication, an antenna is provided instead of the connector 112.

An interface 120 connects the image processing apparatus 100 to the lens unit 300 at the lens mount 106.

A connector 122 electrically connects the image processing apparatus 100 to the lens unit 300. A lens attached/detached state detection unit (not shown) detects whether the lens unit 300 is mounted to the lens mount 106 and/or the connector 122. The connector 122 transfers a control signal, a status signals, a data signal and the like between the image processing apparatus 100 and the lens unit 300, and also has a function of supplying currents of various voltages. The connector 122 may perform not only electrical communications but also optical communication and audio communication and the like.

Each of the recording media 200 and 210 comprises a memory card, a hard disk or the like. The recording medium 200 has a recording unit 202 composed of a semiconductor memory, a magnetic disk or the like, an interface 204 for communication with the image processing apparatus 100, and a connector 206 for connection with the image processing apparatus 100. Likewise, the recording medium 210 has a recording unit 212 composed of a semiconductor memory, a magnetic disk or the like, an interface 214 for communication with the image processing apparatus 100, and a connector 216 for connection with the image processing apparatus 100.

Memory cards such as a PCMCIA card or a compact flash (CF) (registered trademark) card, hard disks, or the like can be used as the recording media 200 and 210. Naturally, the recording media 200 and 210 may also be formed from a micro DAT, a magneto-optical disk, an optical disk such as a CD-R or CD-WR, a phase change optical disk such as a DVD, and the like.

Figure 2:
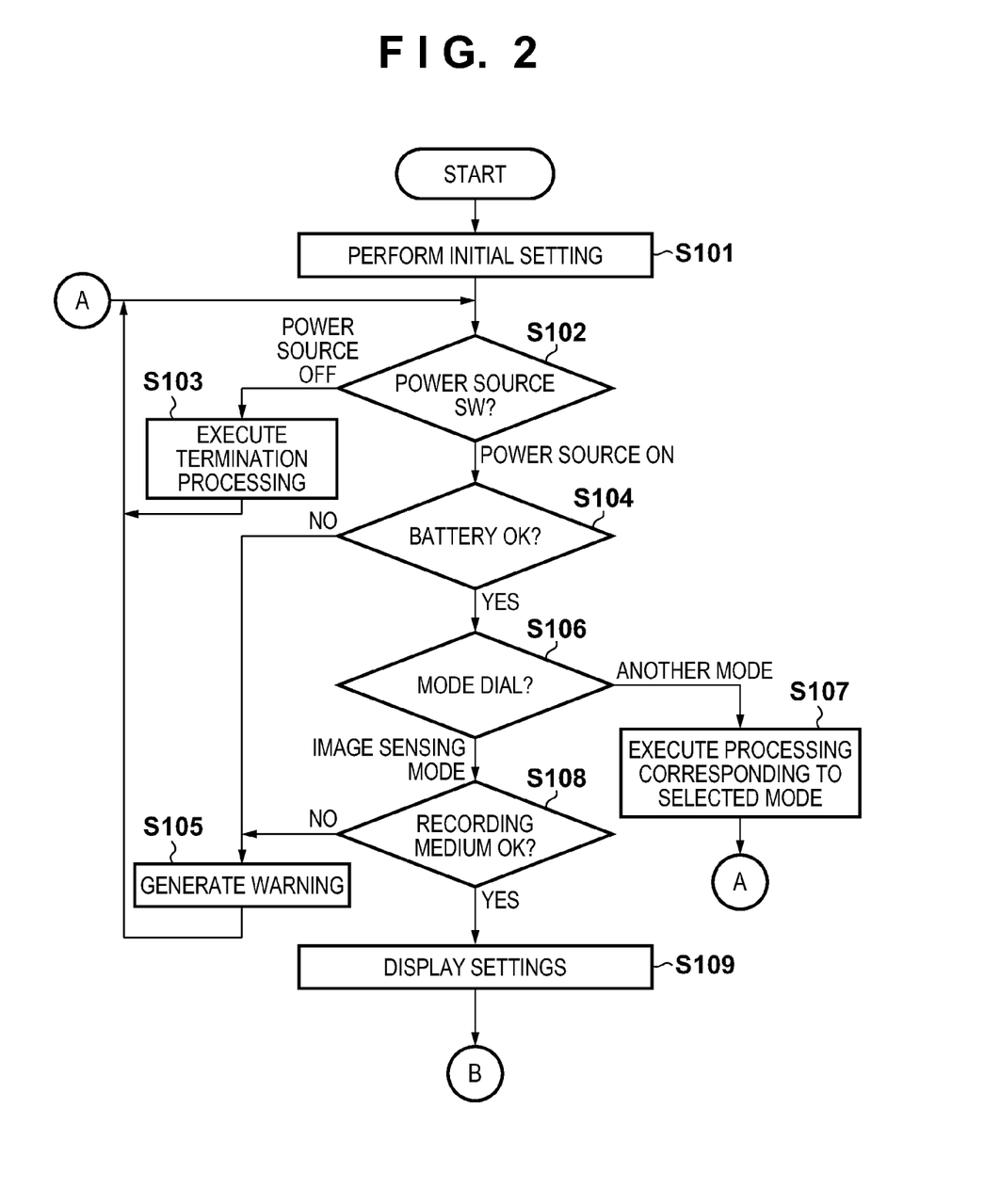
FIG. 2 is a flowchart of a main routine of an image processing apparatus according to the embodiment.
Figure 3:
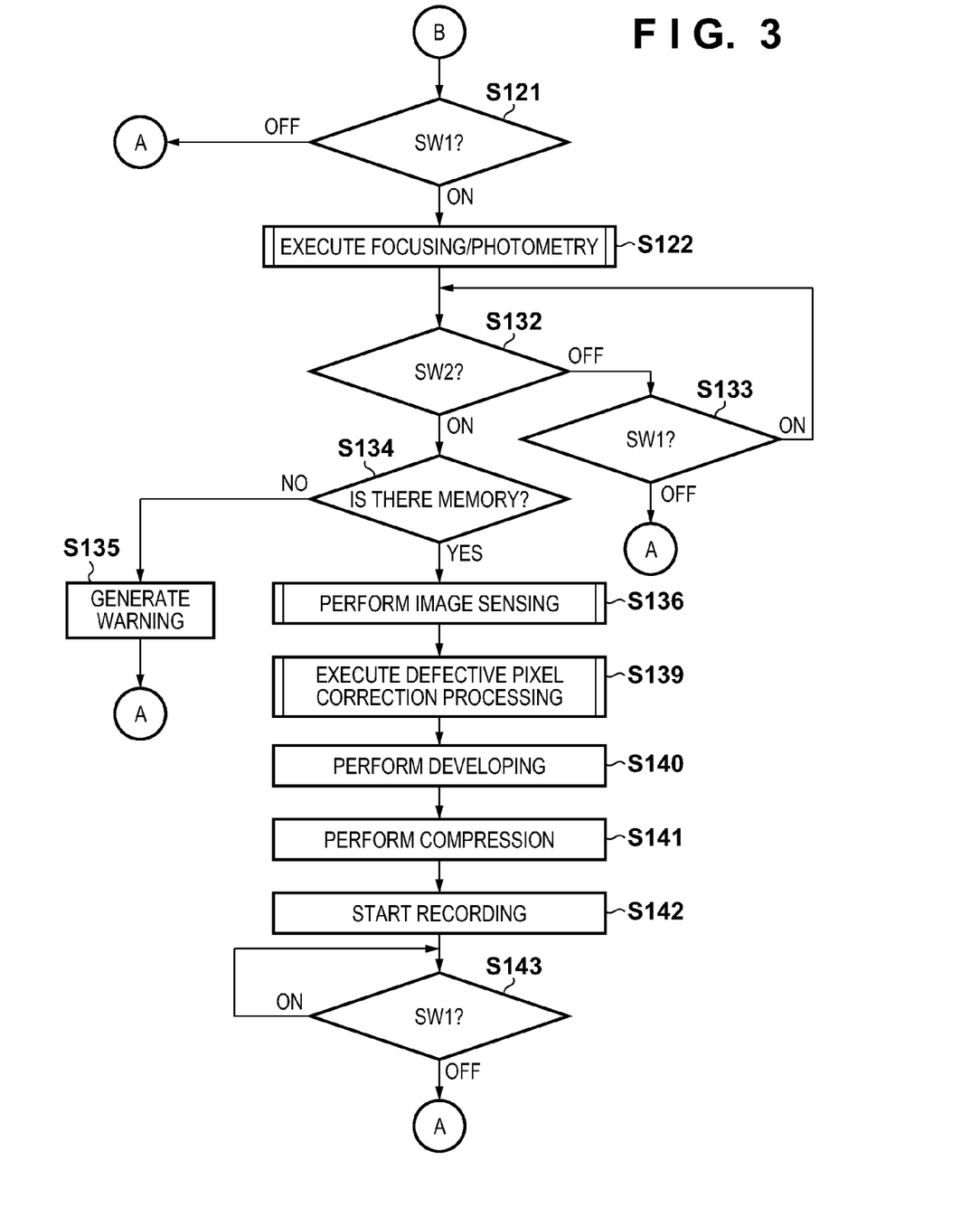
FIG. 3 is a flowchart of the main routine of the image processing apparatus according to the embodiment.

Next, the operation of the image processing apparatus 100 having the above described configuration according to an embodiment of the present invention are described referring to FIG. 2 to FIG. 7. FIG. 2 and FIG. 3 are flowcharts showing the main routine of the image processing apparatus 100 according to the present embodiment.

If the image processing apparatus 100 is powered on by replacing the batteries or the like, the system controller 50 initializes flags and control variables and the like, and performs predetermined initial settings necessary for the respective parts of the image processing apparatus 100 (step S101). Next, the system controller 50 checks the set position of the power switch 72 (step S102). If the power switch 72 is set to "off", the system controller 50 changes the display of each display device to a terminated state, and records necessary parameters including flags and control variables, set values, and set modes in the nonvolatile memory 56. The system controller 50 also executes predetermined termination processing that turns off unnecessary power supplies of the respective parts of the image processing apparatus 100 including the image display unit 28 by means of the power controller 80 (step S103). Thereafter, the process returns to step S102.

If the power switch 72 is set to "on" (step S102), the system controller 50 causes the power controller 80 to determine whether the remaining capacity or operation status of the power source 86 composed of a battery or the like constitutes a problem with respect to the operations of the image processing apparatus 100 (step S104). If a problem exists regarding the power source 86 (NO in step S104), the system controller 50 generates a predetermined warning by means of an image or a sound using the notification unit 54 (step S105), and thereafter the process returns to step S102.

In contrast, if a problem does not exist with respect to the power source 86 (YES in step S104), the system controller 50 determines the set position of the mode dial 60 (step S106). If the mode dial 60 is set to an image sensing mode, the process advances to step S108. If the mode dial 60 is set to another mode, the system controller 50 executes processing corresponding to the selected mode (step S107), and after ending the processing, the process returns to step S102.

The system controller 50 determines whether the recording medium 200 or 210 is mounted in the image processing apparatus 100, and acquires management information of image data recorded on the recording medium 200 or 210. Further, the system controller 50 determines whether the operation state of the recording medium 200 or 210 constitutes a problem with respect to the operations of the image processing apparatus 100, particularly operations to record and playback image data with respect to the recording medium 200 or 210 (step S108). If system controller 50 determines that a problem does not exist, the process advances to step S109, while if system controller 50 determines that there is a problem, the system controller 50 generates a predetermined warning by means of an image or a sound using the notification unit 54 (step S105), and thereafter the process returns to step S102.

In step S109, the system controller 50 notifies the user of various set states of the image processing apparatus 100 by images and sounds using the notification unit 54. If the image display of the image display unit 28 is in an "on" state, the system controller 50 also uses the image display unit 28 to notify the user of the various set states of the image processing apparatus 100 by images and sounds.

Next, in step S121 shown in FIG. 3, the system controller 50 determines the state of the shutter switch SW1. If the system controller 50 determines that the shutter switch SW1 is not pressed, the process returns to step S102. In contrast, if the system controller 50 determines that the shutter switch SW1 is pressed, in step S122 the system controller 50 performs focusing/photometry processing that consists of focusing processing that focuses the image sensing lens 310 on a subject, and photometry processing that determines an f number and a shutter speed. Depending on the photometry result, the flash is also set if needed. The details of the focusing/photometry processing performed in step S122 are described later using FIG. 4.

After completing the focusing/photometry processing, in step S132 the system controller 50 determines the state of the shutter switch SW2. If the system controller 50 determines that the shutter switch SW2 is not pressed, the system controller 50 determines the state of the shutter switch SW1 in step S133. If the shutter switch SW1 is in an "on" state the process returns to step S132, while if the shutter switch SW1 is in an "off" state the process returns to step S102.

In contrast, if the system controller 50 determines that the shutter switch SW2 is pressed, the system controller 50 determines whether the memory 30 has a buffer area that is capable of storing sensed image data (step S134). If there is no free area that is capable of storing new image data in the buffer area of the memory 30, the system controller 50 generates a predetermined warning by means of an image or a sound using the notification unit 54 (step S135), and thereafter the process returns to step S102.

Examples of a case in which there is no free area in the buffer area of the memory 30 include a state immediately after performing sequential image sensing of the maximum number of images which can be stored in the buffer area. In such a case, since a first image that should be read out from the memory 30 and written on the recording medium 200 or 210 has not yet been recorded on the recording medium 200 or 210, a free area for even a single image cannot be secured in the image storage buffer area of the memory 30.

In this connection, the fact that the amount of image data after compression varies according to the setting of the compression mode is taken into consideration when storing sensed image data in the buffer area of the memory 30 after compression. Therefore, whether or not there is an area in which the image data can be stored in the buffer area of the memory 30 is determined in step S134.

If the memory 30 has an image storage buffer area capable of storing sensed image data (YES in step S134), the system controller 50 executes image sensing processing in step S136. In this case, first, the system controller 50 reads out a charge signal that has been accumulated over a predetermined time period from the image sensing device 14, and writes the sensed image data into a predetermined area of the memory 30 via the A/D converter 16, the image processor 20, and the memory controller 22, or via the memory controller 22 directly from the A/D converter 16. Details of the image sensing processing in step S136 are described later using FIG. 5.

When the image sensing processing in step S136 ends, the process advances to step S139 to perform defective pixel correction processing. Details of the defective pixel correction processing in step S139 are described later using FIG. 6 to FIG. 9C.

The system controller 50 reads out, via the memory controller 22, a portion of the image data after defect correction processing that has been written in a predetermined area of the memory 30, and performs WB integration calculation processing and OB integration calculation processing that are necessary for performing developing processing. The system controller 50 stores the calculation results in an internal memory of the system controller 50 or the memory 52.

Thereafter, the system controller 50, using the memory controller 22 and as necessary the image processor 20, reads out the image data after defect correction processing that has been written in the predetermined area of the memory 30. Then, using the calculation results stored in the internal memory of the system controller 50 or the memory 52, the system controller 50 performs various developing processes including AWB processing, gamma conversion processing, and color conversion processing (step S140).

Next, the system controller 50 reads out the image data written in the predetermined area of the memory 30, and performs image compression processing in accordance with the set mode using the compression/expansion circuit 32 (step S141). Thereafter, the system controller 50 writes the sensed image data that has undergone the series of processes in a free area of the image storage buffer area of the memory 30.

Accompanying execution of the series of image sensing processes, the system controller 50 reads out the image data stored in the image storage buffer area of the memory 30. The system controller 50 then starts recording processing that writes the image data onto the recording medium 200 or 210 such as a memory card or compact flash card via the interface 90 or 94 and the connector 92 or 96 (step S142). Each time writing of sensed image data that has undergone a series of processes is newly performed into a free area of the image storage buffer area of the memory 30, the system controller 50 executes the above described recording processing for the relevant image data. Note that while the image data is being written to the recording medium 200 or 210, a display that indicates a recording medium write operation is in progress, for example, by means of a flashing LED, is performed at the notification unit 54 to explicitly indicate that a write operation is in progress.

Subsequently, the system controller 50 advances to step S143 to determine whether the shutter switch SW1 is being pressed. If the shutter switch SW1 is being pressed, the system controller 50 waits until the shutter switch SW1 is released, while if the shutter switch SW1 is not being pressed, the process returns to step S102.

Figure 4:
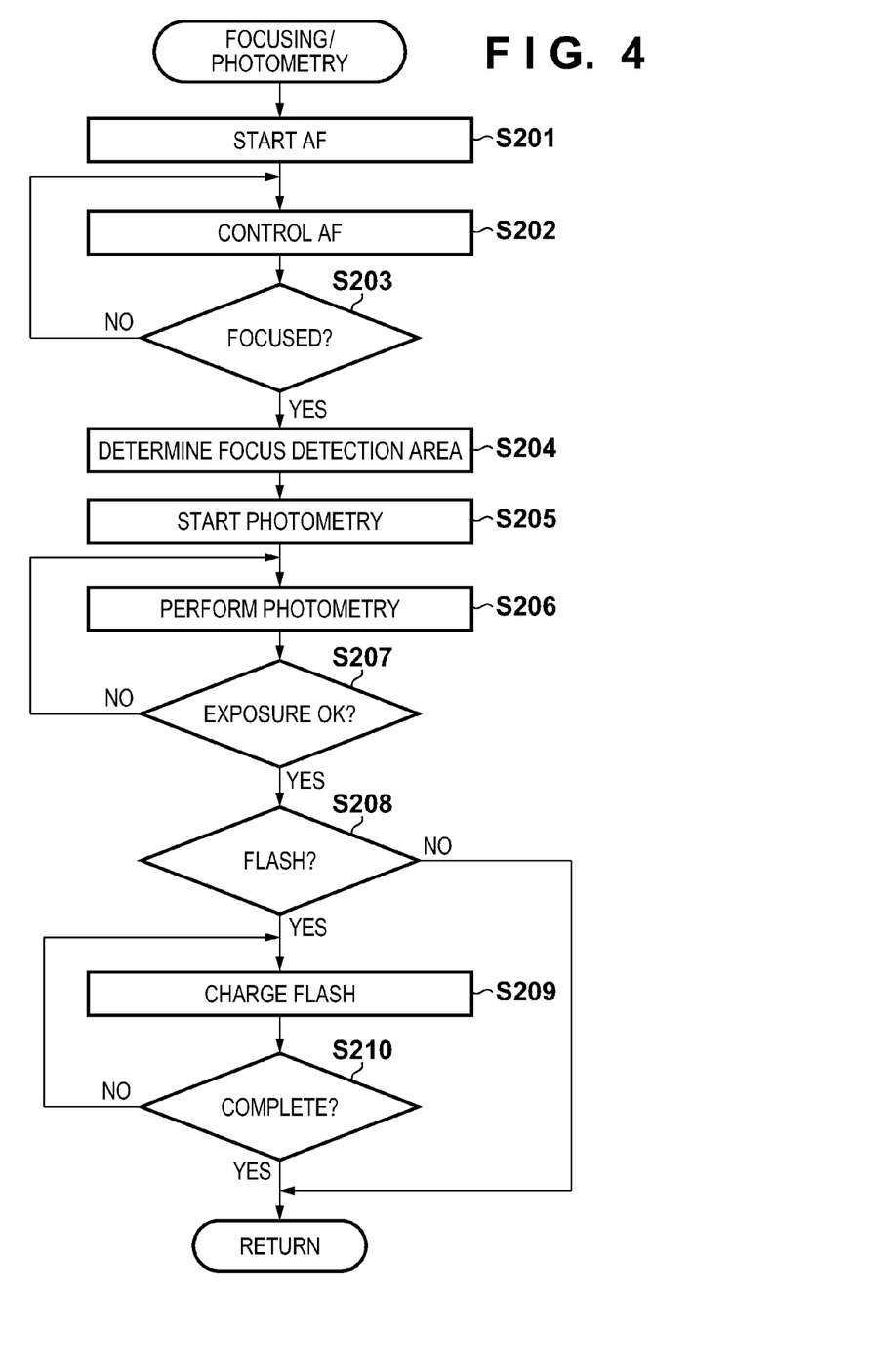
FIG. 4 is a flowchart showing a distance measurement/photometry processing according to the embodiment.

FIG. 4 is a flowchart showing details of focusing/photometry processing executed in step S122 of FIG. 3. In the focusing/photometry processing, various signals are exchanged between the system controller 50 and the aperture controller 340 or focus controller 342 through the interface 120, the connector 122, the connector 322, the interface 320, and the lens system controller 350.

The system controller 50 starts AF processing using the image sensing device 14, the focus controller 42, and the focus controller 342 (step S201). The system controller 50 causes light which entered the image sensing lens 310 to be incident on the focus controller 42 via the aperture 312, the lens mounts 306 and 106, the mirror 130, and an unshown sub-mirror for AF. In this manner, the system controller 50 determines the focused state of an image that is formed as an optical image, and executes AF control that detects the focused state using the focus controller 42 while driving the image sensing lens 310 using the focus controller 342 (step S202), until the system controller 50 determines that the image is in focus (step S203).

When the image is determined to be in focus (YES in step S203), the system controller 50 determines a focus detection area where the image is in focus among a plurality of focus detection areas within the sensed image frame (step S204). The system controller 50 stores data for the focused state and/or set parameters together with data for the determined focus detection area in the internal memory of the system controller 50 or the memory 52.

Next, the system controller 50 starts AE processing using the photometry controller 46 (step S205). The system controller 50 causes light which entered the image sensing lens 310 to be incident on the photometry controller 46 via the aperture 312, the lens mounts 306 and 106, the mirrors 130 and 132, and an unshown photometry lens, to thereby measure the exposure state of an image formed as an optical image. The system controller 50 performs photometry processing using the photometry controller 46 (step S206) until it is determined that the exposure (AE) is appropriate at an ISO sensitivity that is set in advance with the ISO sensitivity switch 69 (step S207).

When the exposure is determined to be appropriate (YES in step S207), the system controller 50 stores the photometry data and/or set parameters in the internal memory of the system controller 50 or the memory 52, and advances to step S208. The system controller 50 determines an f number (Av value) and a shutter speed (Tv value) in accordance with the exposure result detected in the photometry processing step S206 and an image sensing mode set by the mode dial 60. The system controller 50 determines the charge accumulation time of the image sensing device 14 in accordance with the determined shutter speed, and performs image sensing processing that accumulates a charge for the determined charge accumulation time.

The system controller 50 determines whether the flash is required based on the photometry data obtained in the photometry processing in step S206 (step S208). If the flash is required, the flash flag is set, and the flash 48 is charged (step S209). When charging of the flash 48 is completed (YES in step S210), the system controller 50 ends the focusing/photometry processing.

Figure 5:
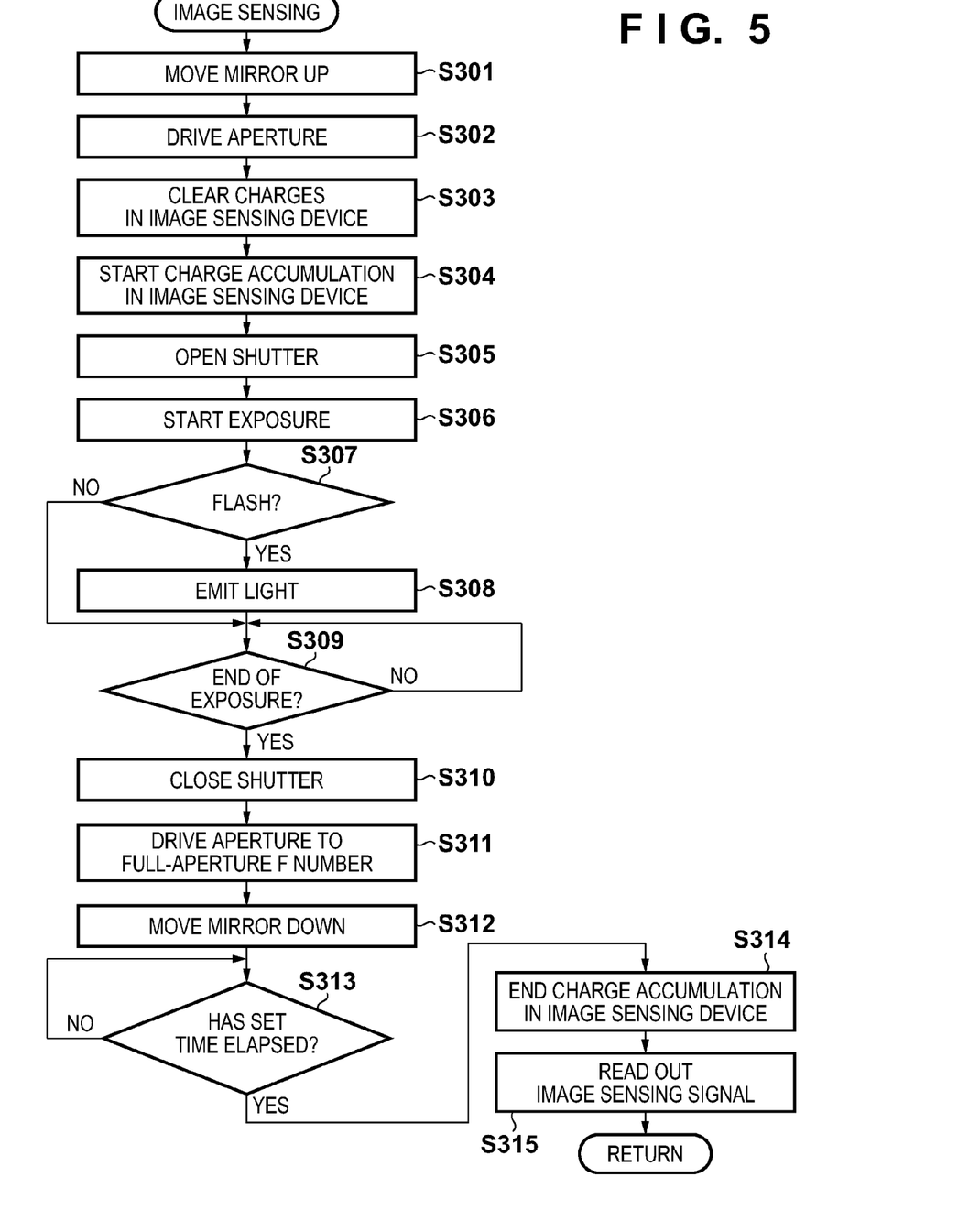
FIG. 5 is a flowchart showing an image sensing processing according to the embodiment.

FIG. 5 shows a flowchart that illustrates details of the image sensing processing performed in step S136 of FIG. 3. In the image sensing processing, the exchange of various signals between the system controller 50 and the aperture controller 340 or the focus controller 342 is performed through the interface 120, the connector 122, the connector 322, the interface 320, and the lens system controller 350.

The system controller 50 moves the mirror 130 to a mirror-up position (step S301), and drives the aperture 312 as far as a predetermined f number by means of the aperture controller 340 in accordance with the photometry data stored in the internal memory of the system controller 50 or the memory 52 (step S302).

Next, the system controller 50 performs an operation to clear the charges in the image sensing device 14 (step S303). Subsequently, the system controller 50 starts charge accumulation of the image sensing device 14 (step S304), and thereafter opens the shutter 12 by means of the shutter controller 40 (step S305), and starts exposure of the image sensing device (step S306). The system controller 50 determines by means of the flash flag whether the flash 48 is required (step S307), and if the flash 48 is required the system controller 50 causes the flash 48 to emit light (step S308).

The system controller 50 waits for the end of exposure of the image sensing device 14 in accordance with the photometry data (step S309), and thereafter closes the shutter 12 by means of the shutter controller 40 (step S310) to end exposure of the image sensing device 14. The system controller 50 drives the aperture 312 to a full-aperture f number by means of the aperture controller 340 (step S311), and moves the mirror 130 to a mirror-down position (step S312).

When the set charge accumulation time elapses (YES in step S313), the system controller 50 ends the charge accumulation in the image sensing device 14 (step S314), and reads the charge signal from the image sensing device 14. Next, the system controller 50 writes image data into a predetermined area of the memory 30 via the A/D converter 16, the image processor 20, and the memory controller 22, or via the memory controller 22 directly from the A/D converter 16 (step S315). When the series of processes ends, the system controller 50 ends the image sensing processing.

Figure 6:
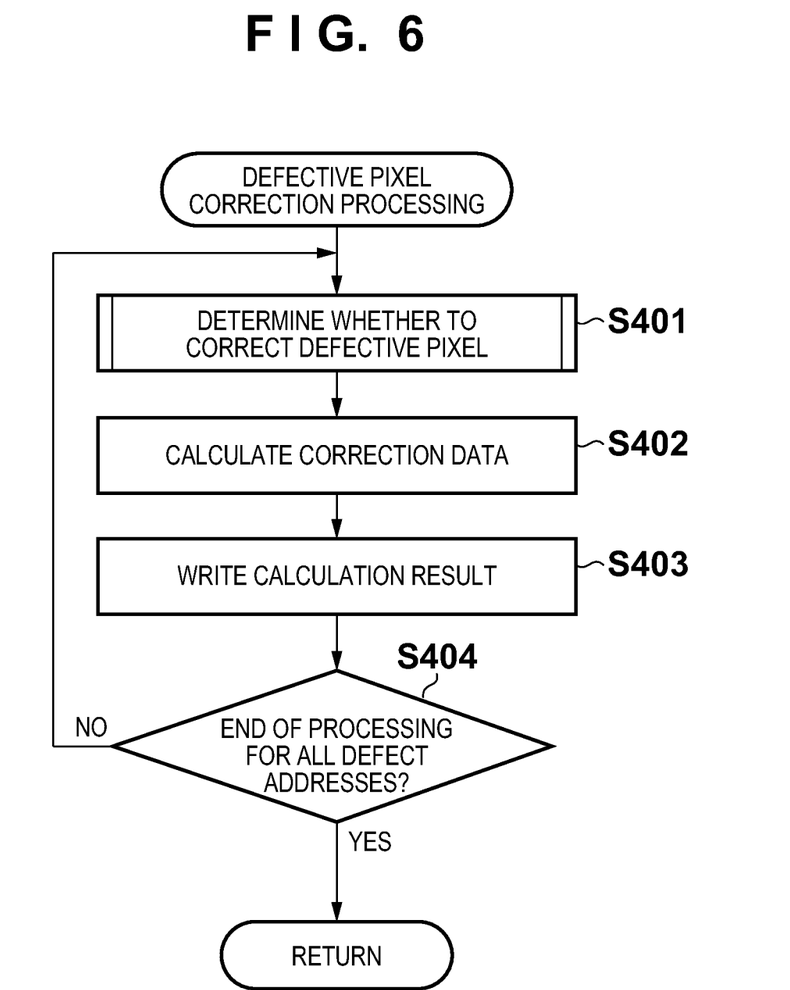
FIG. 6 is a flowchart showing a defective pixel correction processing according to the embodiment.

FIG. 6 shows a flowchart of defective pixel correction processing performed in step S139 of FIG. 3. In step S401, the system controller 50 determines whether to correct a defective pixel. The details of the determination processing performed by the system controller 50 in step S401 are described later using FIG. 7.

Next, in step S402, if it is determined based on the correction determination result for a defective pixel obtained in step S401 that the relevant pixel should be corrected, the system controller 50 calculates a correction amount for the pixel. Subsequently, in step S403, the system controller 50 writes the correction amount calculated in step S402 in the address of the relevant pixel in the memory 30 to thereby complete the defect correction processing for the relevant pixel. In this connection, various methods can be considered as correction methods, and a method that corrects a defective pixel using any correction algorithm may also be applied in the present invention.

In step S404, the system controller 50 determines whether defect correction processing for all defective pixels listed in the defect data is completed. If defect correction processing for all the defective pixels is not completed, the system controller 50 returns to step S401 to make a determination with respect to a defect correction pixel, and repeat the above described processing in the same manner. When correction processing for all defect correction pixels selected in step S401 finishes, the system controller 50 ends the defective pixel correction processing sequence.

Figure 7:
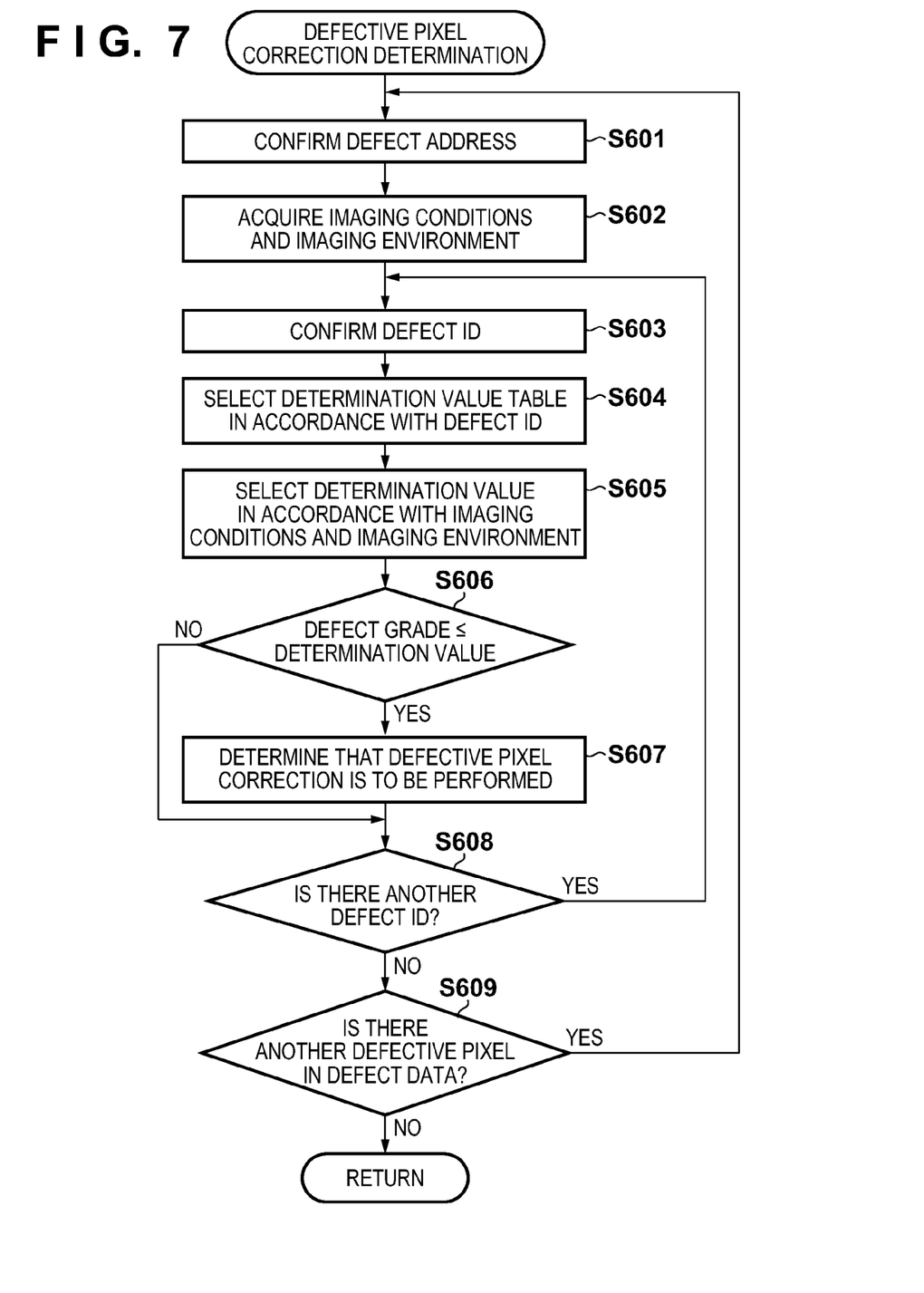
FIG. 7 is a flowchart showing a defective pixel determination processing according to the embodiment.

Next, the processing to determine whether to correct a defective pixel in step S401 of FIG. 6 is described referring to the flowchart of FIG. 7. First, the system controller 50 reads in defect information for a single defective pixel from the start of the defect data stored in the memory 52 (step S601). The system controller 50 can identify the address of the relevant pixel in a sensed image that is written in the memory 30 from the address information of the defective pixel that is stored in the defect information. Next, the system controller 50 acquires information regarding the imaging conditions and imaging environment when the image sensing was performed (step S602). In this case, the term "imaging conditions" refers to at least one of the ISO sensitivity, the charge accumulation time, and the f number. Further, the term "imaging environment" refers to, for example, the temperature at the time of the image sensing operation. Naturally, the imaging conditions and imaging environment according to the invention of the present application are not limited to the aforementioned examples.

Figure 8:
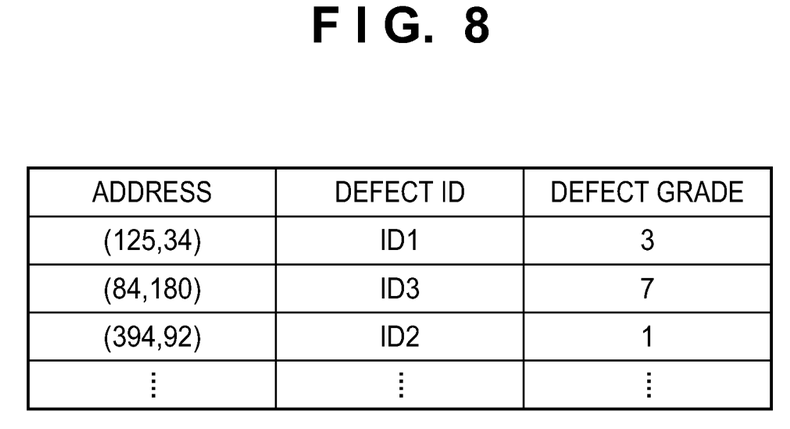
FIG. 8 is a view showing an example of defect data according to the embodiment.
Figure 9A:
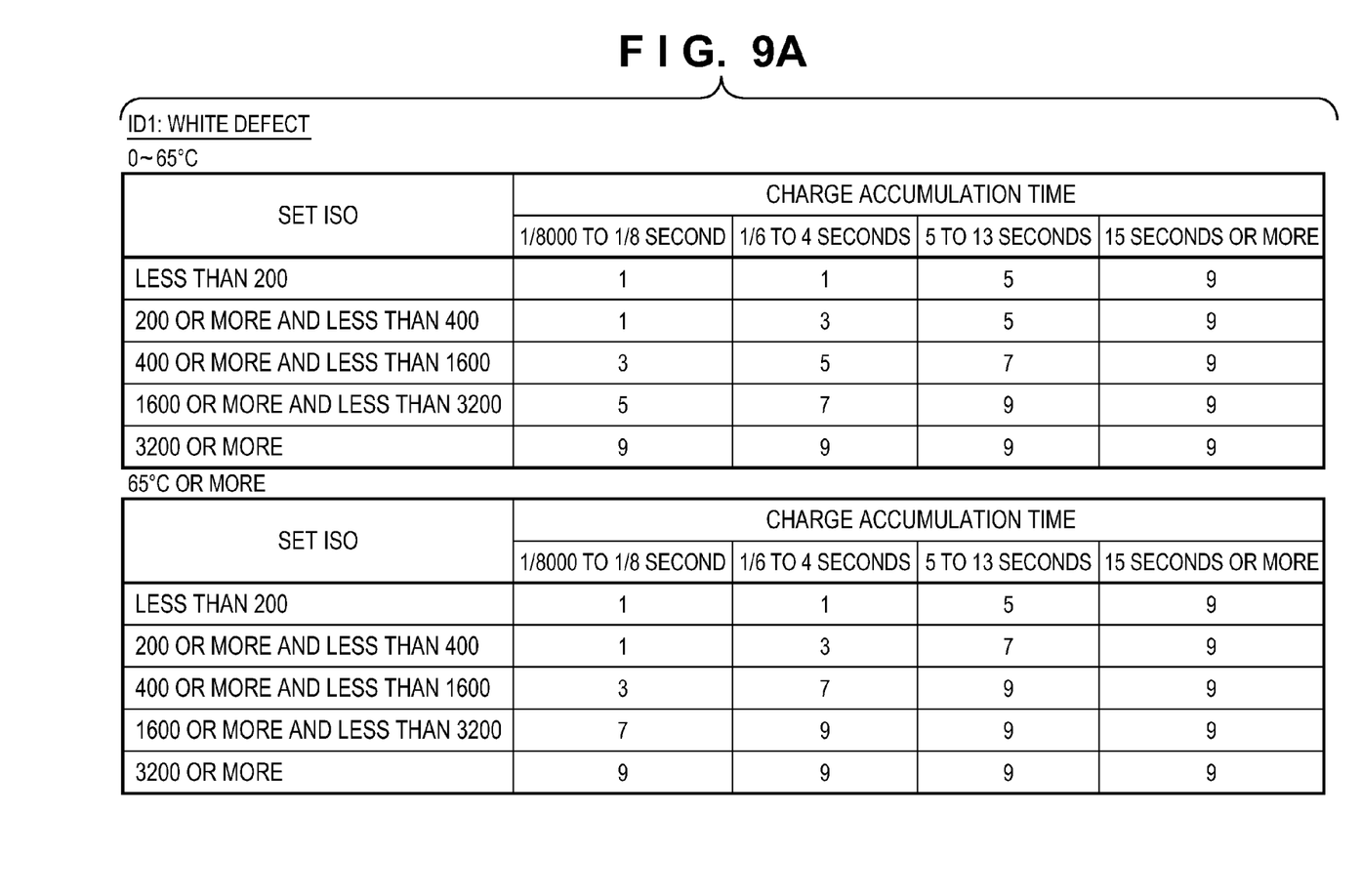
FIG. 9A to FIG. 9C are views showing determination value tables for making a defect correction determination according to the embodiment.
Figure 9B:
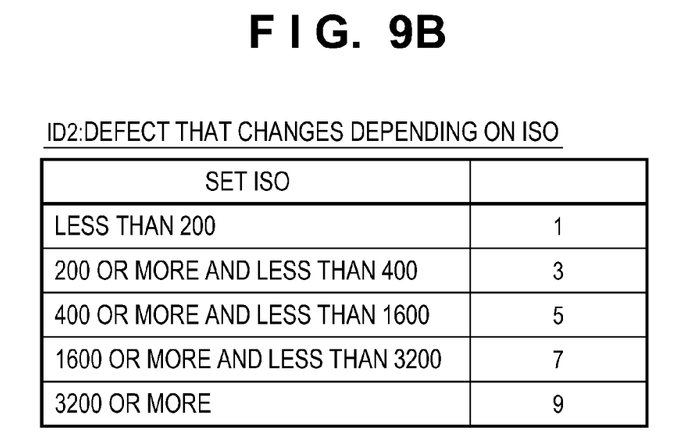
Figure 9C:
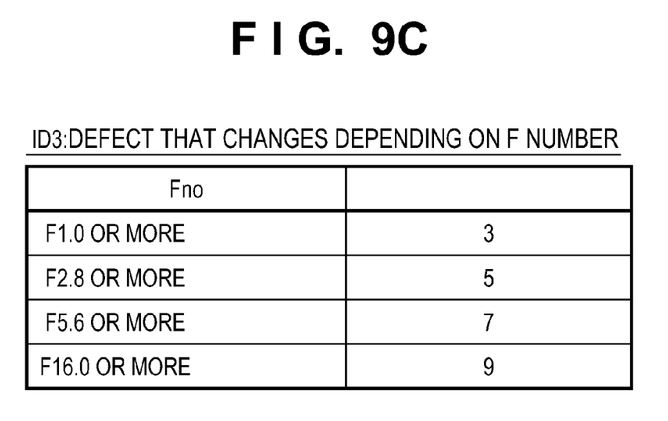

Next, the system controller 50 reads in a defect ID showing the kind of defect for a single defective pixel from the defect data (step S603). In this case, the defect ID also serves as reference table information that shows a determination value table to be referred to with respect to the respective defective pixels. FIG. 8 is a view showing an example of defect data. As described above, the defect data is previously stored in, for example, the memory 52. As shown in FIG. 8, the defect data includes the address, defect ID, and defect grade of each defective pixel. The system controller 50 selects a determination value table to be referred to in accordance with the ID shown in the defect data (step S604). Further, from the determination value table, the system controller 50 selects a determination value that is information showing a grade of the defective pixel to be subject to correction because the defect is conspicuous under the acquired imaging conditions and imaging environment (step S605). FIG. 9A to FIG. 9C are views showing examples of determination value tables that are stored in advance, for example, in the memory 52. An operation the system controller 50 performs in step S604 to select a determination value table, and an operation the system controller 50 performs in step S605 to select a determination value will now be described referring to FIG. 9A to FIG. 9C.

The term "determination value table" refers to a table that the system controller 50 uses to determine whether and/or not to correct a defective pixel, employing an imaging condition or imaging environment as a parameter. The examples shown in FIG. 9A to FIG. 9C include determination value tables that correspond to three kinds of defect IDs: white defects of ID1 that are shown in FIG. 9A; defects of ID2 shown in FIG. 9B that are defects for which the grade of the defective pixel to be subject to correction is changed according to the ISO; and defects of ID3 shown in FIG. 9C that are defects for which the grade of the defective pixel to be subject to correction is changed according to the f number (aperture value). More specifically, the ID2 defects are so-called "blinking defects" that are affected only by the ISO sensitivity condition when sensing an image, and are not affected by the temperature or shutter speed. Further, although the ID3 defects are not defective pixels of the image sensing device 14 itself, when a case is assumed in which there is a defect on a cover glass of a package in which the image sensing device 14 is enclosed, such as when there is foreign matter on the cover glass or when there is a scratch on the cover glass or the like, it is known that an image that is sensed is such a case may be adversely affected depending on the aperture condition when performing image sensing. More specifically, if the aperture of the lens is near to the full-aperture side when image sensing is performed, a defect of the cover glass is reflected in a blurred state on the image sensing device 14, and hence the defect is not clearly reflected onto the image sensing device 14 and there is little influence on the image quality. However, if the lens aperture is narrowed when performing image sensing, a defect of the cover glass is clearly reflected onto the image sensing device 14 and it is necessary to perform correction processing, similarly to the case of a defective pixel of the image sensing device 14. The determination value table for such a case is entirely unrelated to the sensitivity, shutter speed, temperature and the like, and is determined only based on aperture information at the time of image sensing. In this connection, the kinds of defects are not limited to the above described examples, and a configuration may be adopted that has determination value tables that correspond to other kinds of defects.

The settings with respect to these classification levels and the number of classifications of the defect data depend on the number of detectable levels and the detection accuracy of the data at the time of shipment, and the settings are determined by taking those factors and the image quality of images that are actually obtained into consideration. Furthermore, these classification processes are performed outside the image processing apparatus 100. Therefore, since only the addresses of pixels that are extracted based on the classification levels and the number of classifications that are determined in the above described manner are received by the image processing apparatus 100, a large load is not placed on the processing capacity of the image processing apparatus 100.

After the system controller 50 reads in the defect ID of the defective pixel in step S603, the system controller 50 selects one table from among the determination value tables shown in FIG. 9A to FIG. 9C in accordance with the defect ID that is read in (step S604). For example, when the defect ID is ID1 (white defect), the system controller 50 selects the determination value table shown in FIG. 9A (step S604). Here, it is assumed that the information regarding the imaging conditions and imaging environment acquired in step S602 indicate, for example, an ISO sensitivity of 400, a charge accumulation time of one second, a temperature of 25° C., and an f number (aperture value) of 2.8. In the ID1 determination value table, the determination values vary according to the temperature, ISO sensitivity, and charge accumulation time conditions. In this example, since the temperature is 25° C., a determination value 5 is selected that corresponds to an ISO sensitivity of 400 and a charge accumulation time of one second in the determination value table on the upper side in FIG. 9A (step S605).

In the above described example, if there is a change in the imaging conditions and, for example, the temperature becomes equal to or greater than 65° C., the determination value table on the lower side in FIG. 9A is selected. Further, in the above described example, if the defect ID that is read in step S603 is ID2, a determination value 5 is selected from the determination value table shown in FIG. 9B, while if the defect ID is ID3, a determination value 5 is similarly selected from the determination value table shown in FIG. 9C.

After selecting a determination value in step S605 in the above described manner, in step S606 the system controller 50 reads out a defect grade from the defect data. Defect grades are information showing the grades of defective pixels that are determined by classifying levels showing the conspicuity of defects of defective pixels into a number of gradations in accordance with the output signal levels. The system controller 50 compares the defect grade with the determination value selected in step S605, and determines if defect correction is necessary or not based on the comparison result. If the defect grade that is read out from the defect data is less than or equal to the determination value, the process advances to step S607 in which the system controller 50 determines that the relevant defective pixel is to be corrected, and thereafter the process advances to step S608. In contrast, if the defect grade is greater than the determination value, the process advances directly to step S608.

In step S608, the system controller 50 determines whether other defect ID information is stored for the relevant defective pixel. If other defect ID information is stored, the process shifts to step S603, and the processing of the above described steps S603 to S608 is repeated. Thus, a plurality of defect IDs and defect grades may be held for a single defective pixel. In such a case, the system controller 50 determines whether or not to perform defect correction for each ID, and when it is determined that correction is to be performed based on the determination result for any defect ID, the relevant pixel is corrected.

In step S608, when there is no other defect ID for the relevant defective pixel, the process advances to step S609. In step S609, if there is information for a next defective pixel in the defect data, the system controller 50 performs the operations of steps S601 to S608 for the relevant pixel. Thus, the system controller 50 distinguishes between the defective pixels by means of the defect IDs, and determines whether or not to correct a defective pixel in accordance with the imaging conditions and imaging environment based on this information.

Note that a configuration may also be adopted in which a plurality of determination units that determine whether or not to perform correction are provided for each defect ID.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-174256, filed on Aug. 9, 2011 which is hereby incorporated by reference herein in its entirety.

What is claimed is:

1. An image processing apparatus that processes image data that is output from an image sensing device including a plurality of pixels, comprising:
   a storage unit that stores defect data that comprises: a plurality of tables in which imaging conditions or an imaging environment and first information showing grades of defective pixels that are subject to correction are associated with each other; and, with respect to each defective pixel among the plurality of pixels, address information, reference table information showing a table to be referred to among the plurality of tables, and second information showing a grade of the defective pixel;
   an acquisition unit that acquires an imaging condition and an imaging environment at a time of image sensing;
   a determination unit that compares the first information that is shown by a table corresponding to the reference table information and the second information of each defective pixel in the defect data with respect to the imaging condition or imaging environment that said acquisition unit acquires, and determines whether defect correction of each defective pixel is necessary or not based on a comparison result; and
   a correction unit that performs the defect correction on image data that is output from a defective pixel for which said determination unit determines that defect correction is necessary;
   wherein:
   the imaging conditions include a charge accumulation time, a sensitivity, and an f number at a time of image sensing, and the imaging environment includes a temperature of said image sensing device at a time of image sensing; and
   the plurality of tables include: a first table showing a temperature of said image sensing device at a time of image sensing, a sensitivity at a time of image sensing, a charge accumulation time at a time of image sensing, and a grade of a defective pixel that is subject to correction; a second table showing a sensitivity at a time of image sensing and a grade of a defective pixel that is subject to correction; and a third table showing an f number at a time of image sensing and a grade of a defective pixel that is subject to correction.

2. The image processing apparatus according to claim 1, wherein said storage unit can store a plurality of items of defect data for a single defective pixel.

3. The image processing apparatus according to claim 2, wherein said determination unit determines whether defect correction is necessary or not for each of the plurality of items of defect data, and if said determination unit determines that defect correction is necessary based on any one of the plurality of items of defect data, said correction unit performs the defect correction on image data that is output from the defective pixel.

4. An image processing method for an image processing apparatus that processes image data that is output from an image sensing device including a plurality of pixels, and that has a first storage unit that stores a plurality of tables in which imaging conditions or an imaging environment and first information showing grades of defective pixels that are subject to correction are associated with each other, and a second storage unit that stores defect data including, with respect to each defective pixel among the plurality of pixels, address information, reference table information showing a table to be referred to among the plurality of tables, and second information showing a grade of the defective pixel, comprising:
   an acquisition step of acquiring an imaging condition and an imaging environment at a time of image sensing;
   a determination step of comparing the first information that is shown by a table corresponding to the reference table information and the second information of each defective pixel in the defect data with respect to the imaging condition or imaging environment that is acquired in said acquisition step, and determining whether defect correction of each defective pixel is necessary or not based on a comparison result; and
   a correction step of performing the defect correction on image data that is output from a defective pixel for which it is determined that defect correction is necessary in said determination step;
   wherein:
   the imaging conditions include a charge accumulation time, a sensitivity, and an f number at a time of image sensing, and the imaging environment includes a temperature of said image sensing device at a time of image sensing; and
   the plurality of tables include: a first table showing a temperature of said image sensing device at a time of image sensing, a sensitivity at a time of image sensing, a charge accumulation time at a time of image sensing, and a grade of a defective pixel that is subject to correction; a second table showing a sensitivity at a time of image sensing and a grade of a defective pixel that is subject to correction; and a third table showing an f number at a time of image sensing and a grade of a defective pixel that is subject to correction.

5. A non-transitory readable storage medium having stored thereon a program which is executable by an image processing apparatus, the program having a program code for causing the image processing apparatus to function as the image processing apparatus according to claim 1.

6. A non-transitory readable storage medium having stored thereon a program which is executable by an image processing apparatus, the program having a program code for realizing the image processing method according to claim 4.

* * * * *